(12) United States Patent
Jang et al.

(10) Patent No.: US 10,279,695 B2
(45) Date of Patent: May 7, 2019

(54) ELECTRIC VEHICLE PARALLEL CHARGING METHOD AND APPARATUS

(71) Applicants: HYUNDAI MOTOR COMPANY, Seoul (KR); KIA MOTORS CORPORATION, Seoul (KR)

(72) Inventors: Jin Su Jang, Hwaseong-si (KR); Taek Hyun Jung, Hwaseong-si (KR); Zeung Il Kim, Hwaseong-si (KR); Jae Yong Seong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 87 days.

(21) Appl. No.: 15/657,776

(22) Filed: Jul. 24, 2017

(65) Prior Publication Data

US 2018/0037124 A1 Feb. 8, 2018

(30) Foreign Application Priority Data

Aug. 8, 2016 (KR) .................... 10-2016-0100914
Sep. 12, 2016 (KR) .................... 10-2016-0117570
Jul. 7, 2017 (KR) .................... 10-2017-0086270

(51) Int. Cl.
*H02J 7/00* (2006.01)
*B60L 11/18* (2006.01)
*H02J 7/02* (2016.01)
*B60L 1/00* (2006.01)
*H02J 50/12* (2016.01)

(52) U.S. Cl.
CPC ............ *B60L 11/1824* (2013.01); *B60L 1/00* (2013.01); *B60L 11/182* (2013.01); *B60L 11/1811* (2013.01); *B60L 11/1816* (2013.01); *B60L 11/1838* (2013.01); *B60L 11/1861* (2013.01); *B60L 11/1868* (2013.01); *H02J 7/007* (2013.01); *H02J 7/0055* (2013.01); *H02J 7/025* (2013.01); *H02J 7/0077* (2013.01); *H02J 7/02* (2013.01); *H02J 50/12* (2016.02)

(58) Field of Classification Search
CPC ........ H02J 7/025; H01F 38/14; Y02T 90/122; B60L 11/182; Y02E 60/12
USPC ...................................................... 320/108
See application file for complete search history.

(56) References Cited

U.S. PATENT DOCUMENTS

| | | | | |
|---|---|---|---|---|
| 8,977,393 | B1 * | 3/2015 | Kohler | H02J 7/02 700/248 |
| 2012/0091790 | A1 * | 4/2012 | Utsumi | B60K 6/46 307/9.1 |
| 2012/0259723 | A1 * | 10/2012 | Ansari | B60L 11/1844 705/26.3 |

* cited by examiner

*Primary Examiner* — Arun C Williams
(74) *Attorney, Agent, or Firm* — Morgan Lewis and Bockius LLP

(57) ABSTRACT

An electric vehicle (EV) parallel charging method may comprise determining whether a parallel charging input is detected or not, the parallel charging input being an input that both a conductive charging input and an inductive charging input are sensed; in response to determining that the parallel charging input is detected, comparing a power of the conductive charging input with a power of the inductive charging input; selecting an input applied to a high-voltage battery and an input applied to at least one of an auxiliary battery and a load based on a result of the comparison; and performing a parallel charging operation for the high-voltage battery and at least one of the auxiliary battery and the load by using powers supplied from the selected inputs.

20 Claims, 8 Drawing Sheets

ELECTRIC VEHICLE PARALLEL CHARGING METHOD AND APPARATUS

CROSS-REFERENCE TO RELATED APPLICATION

The present application claims priority to Korean Patent Applications No. 10-2016-0100914 filed on Aug. 8, 2016, No. 10-2016-0117570 filed on Sep. 12, 2016 and No. 10-2017-0086270 filed on Jul. 7, 2017, the entire contents of which is incorporated herein for all purposes by this reference.

TECHNICAL FIELD

The present invention relates to a method and an apparatus for electric vehicle (EV) parallel charging, more particularly, to a method and an apparatus for charging a battery of an EV by using both of inductive charging and conductive charging in an environment where both of an inductive charging input and a conductive charging input are available.

BACKGROUND

An electric vehicle (EV) charging system may basically be defined as a system for charging a high-voltage battery mounted on an EV by using power of an energy storage device or a power grid of a commercial power source. Such the EV charging system may have various forms according to the type of EV. For example, the EV charging system may be classified into a conductive charging type using a charging cable and a non-contact wireless power transfer (WPT) type (also referred to as an 'inductive charging type').

In the case of inductive charging using a WPT system, when it is necessary to charge the high-voltage battery mounted on the EV, the EV may move to a ground assembly (GA) located in a charging station or a charging spot capable of EV charging.

When charging the EV, a vehicle assembly (VA) (i.e., a reception pad in the VA) mounted on the EV makes an inductive resonance coupling with a transmission pad of the GA located in the charging station or the charging spot, and charges the battery in the EV using power transferred from the GA through the inductive resonance coupling. Thus, the most of EVs have the reception pad for the inductive resonance coupling with the transmission pad.

Meanwhile, the conventional electric vehicle charging system receives an alternating current (AC) input from an external power supply when performing the inductive charging or conductive charging, and converts it into a direct current (DC) to charge the high-voltage battery. Also, the output of the high-voltage battery may be used to charge an auxiliary battery charge and to drive various 12V electronic equipment via a low voltage DC-to-DC converter (LDC). However, such the structure is a main reason of lengthening a charging time required for charging the high-voltage battery.

For example, assuming that an external electric power of 2.2 kW (220V/10 A) is supplied to an EV and used to charge a high-voltage battery of the EV, approximately 360V/1~2 A or more power from about 360V/6 A power which should be used to charge the high-voltage battery may be consumed for charging the auxiliary battery and driving the various 12V electronic equipment. This may correspond to 1/3 to 1/4 of the actual charging power, which has a considerable influence on the charging time for the high-voltage battery.

Also, in the conventional technology, since it is possible to charge the high-voltage battery by using only one of the inductive charging and the conductive charging, both types of charging methods cannot be used simultaneously even when the EV has capabilities for both types. Therefore, it is very inefficient in terms of utilization of EV charging resources.

The information disclosed in this Background of the Invention section is only for enhancement of understanding of the general background of the invention and may not be taken as an acknowledgement or any form of suggestion that this information forms the prior art already known to a person skilled in the art.

SUMMARY

Embodiments of the present disclosure provide an EV parallel charging method in which both of an inductive type charging and a conductive type charging are simultaneously performed for charging an EV.

Embodiments of the present disclosure also provide an EV parallel charging apparatus for charging an EV by simultaneously using both of an inductive type charging and a conductive type charging.

According to embodiments of the present invention, an electric vehicle (EV) parallel charging method performed in an EV parallel charging apparatus may comprise: determining whether a parallel charging input is detected or not, the parallel charging input being an input that both a conductive charging input and an inductive charging input are sensed; in response to determining that the parallel charging input is detected, comparing a power of the conductive charging input with a power of the inductive charging input; selecting an input applied to a high-voltage battery and an input applied to at least one of an auxiliary battery and a load based on a result of the comparison; and performing a parallel charging operation for the high-voltage battery and at least one of the auxiliary battery and the load by using powers supplied from the selected inputs.

The method may further comprise, after the determining whether a parallel charging input is detected or not, inactivating a low-voltage direct current to direct current converter (LDC) connected between the high-voltage battery and the auxiliary battery.

The method may further comprise: in response to determining that the parallel charging input is not detected, performing a single charging operation using either the conductive charging input or the inductive charging input; monitoring a state of charge (SOC) of the auxiliary battery while performing the single charging operation; determining whether the SOC of the auxiliary battery is equal to or below a threshold; and in response to determining that the SOC of the auxiliary battery is equal to or below the threshold, performing a charging for the auxiliary battery using a power transferred from the high-voltage battery by activating the LDC.

In the determining whether a parallel charging input is detected or not, the inductive charging input may be sensed according to whether a wireless communication pairing between an electric vehicle communication controller (EVCC) and a supply equipment communication controller (SECC) has been established or not.

In the determining whether a parallel charging input is detected or not, the conductive charging input may be sensed according to whether a conductive input of a control pilot or a power driver (PD) is recognized or not.

In the comparing a power of the conductive charging input with a power of the inductive charging input, the power P1 of the conductive charging input may be determined based on a current of a control pilot and a system voltage which are supplied in a conductive manner.

In the comparing a power of the conductive charging input with a power of the inductive charging input, an upper limit of an output power of a supply equipment communication controller (SECC) may be determined as the power P2 of the inductive charging input.

In the selecting an input applied to a high-voltage battery and an input applied to at least one of an auxiliary battery and a load, an input having a higher power among the conductive charging input and the inductive charging input may be selected as the input applied to the high-voltage battery, and an input having a lower power among the conductive charging input and the inductive charging input may be selected as the input applied to the at least one of the auxiliary battery and the load.

The performing a parallel charging operation may include turning off a relay switch connected between the input applied to the high-voltage battery and the at least one of the auxiliary battery and the load.

The performing a parallel charging operation may include turning off a relay switch connected between the high-voltage battery and the input applied to the at least one of the auxiliary battery and the load.

Furthermore, in accordance with embodiments of the present invention, an EV parallel charging apparatus may comprise at least one processor and a memory storing instructions executed by the at least one processor. Also, the instructions may be configured to: determine whether a parallel charging input is detected or not, the parallel charging input being an input that both a conductive charging input and an inductive charging input are sensed; in response to determining that the parallel charging input is detected, compare a power of the conductive charging input with a power of the inductive charging input; select an input applied to a high-voltage battery and an input applied to at least one of an auxiliary battery and a load based on a result of the comparison; and perform a parallel charging operation for the high-voltage battery and at least one of the auxiliary battery and the load by using powers supplied from the selected inputs.

The instructions may be further configured to inactivate a low-voltage direct current to direct current converter (LDC) connected between the high-voltage battery and the auxiliary battery after whether a parallel charging input is detected or not is determined.

The instructions may be further configured to: in response to determining that the parallel charging input is not detected, perform a single charging operation using either the conductive charging input or the inductive charging input; monitor a state of charge (SOC) of the auxiliary battery while performing the single charging operation; determine whether the SOC of the auxiliary battery is equal to or below a threshold; and in response to determining that the SOC of the auxiliary battery is equal to or below the threshold, perform a charging for the auxiliary battery using a power transferred from the high-voltage battery by activating the LDC.

The instructions may be further configured to sense the inductive charging input according to whether a wireless communication pairing between an electric vehicle communication controller (EVCC) and a supply equipment communication controller (SECC) has been established or not.

The instructions may be further configured to sense the conductive charging input according to whether a conductive input of a control pilot or a power driver (PD) is recognized or not.

The instructions may be further configured to determine the power P1 of the conductive charging input based on a current of a control pilot and a system voltage which are supplied in a conductive manner.

The instructions may be further configured to determine an upper limit of an output power of a supply equipment communication controller (SECC) as the power P2 of the inductive charging input.

An input having a higher power among the conductive charging input and the inductive charging input may be selected as the input applied to the high-voltage battery, and an input having a lower power among the conductive charging input and the inductive charging input may be selected as the input applied to the at least one of the auxiliary battery and the load.

A relay switch, which is connected between the input applied to the high-voltage battery and the at least one of the auxiliary battery and the load, may be turned off when the parallel charging operation is performed.

A relay switch, which is connected between the high-voltage battery and the input applied to the at least one of the auxiliary battery and the load, may turned off when the parallel charging operation is performed.

Using the EV parallel charging method and apparatus according to the embodiments of the present disclosure as described above, the charging time required for charging the high-voltage battery of the EV can be remarkably shortened as compared with the conventional single charging operation.

According to the embodiments of the present disclosure, it is made possible to perform independent charging control between a low-voltage battery (i.e., auxiliary battery) and a high-voltage battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
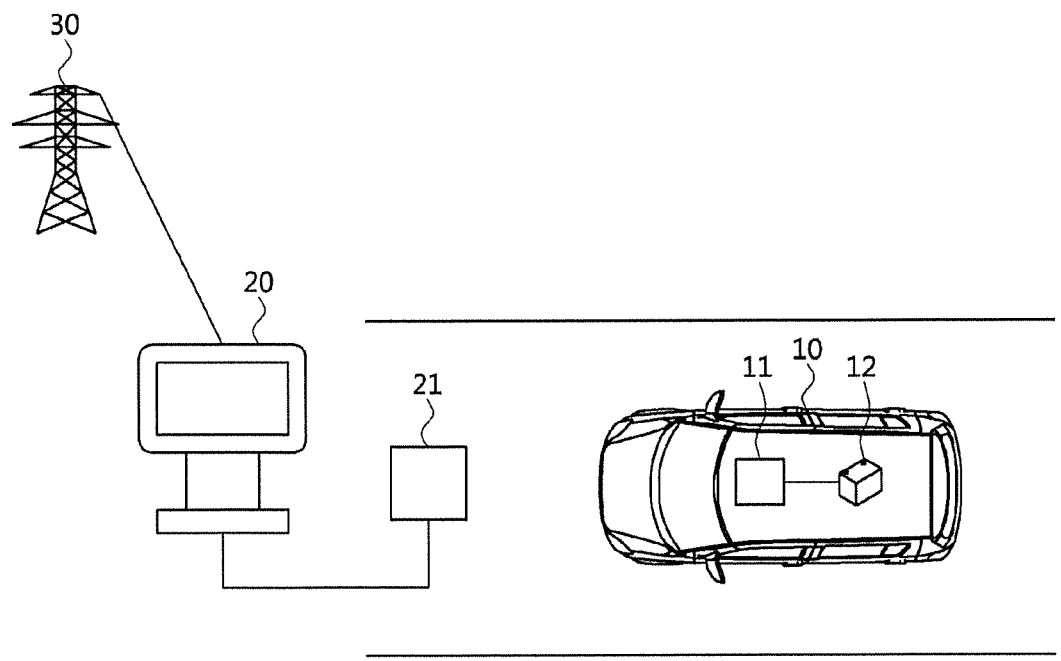
FIG. 1 is a conceptual diagram illustrating a concept of a wireless power transfer (WPT) to which an exemplary embodiment of the present invention is applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that although the terms "first," "second," etc. may be used herein to describe various components, these components should not be limited by these terms. These terms are used merely to distinguish one element from another. For example, without departing from the scope of the present invention, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present invention are defined as follows.

"Electric Vehicle, EV": An automobile, as defined in 49 CFR 523.3, intended for highway use, powered by an electric motor that draws current from an on-vehicle energy storage device including a battery, which is rechargeable from an off-vehicle source including residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (REV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": A system for a wireless power transfer and control between the GA and VA including alignment and communications. This system transfers energy from the electric supply network to the electric vehicle electromagnetically through a two-part loosely coupled transformer.

"Wireless power transfer, WPT": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present invention, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. In the present invention, coupling between the GA Coil and the VA Coil.

"Ground assembly, GA'": An assembly on the infrastructure side including the GA Coil, a power/frequency conversion device and GA controller as well as the wiring from the grid and between each device, filtering circuits, housing(s) etc., necessary to function as the power source of wireless power charging system. The GA may include the communication elements necessary for communication between the GA and the VA.

"Vehicle assembly, VA": An assembly on the vehicle including the VA Coil, rectifier/power conversion device and VA controller as well as the wiring to the vehicle batteries and between each device, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be disposed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top portion of the litz wire or the top portion of the magnetic material in the GA Coil to the plane of the lower of the bottom portion of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom portion of the litz wire or the magnetic material in the VA Coil mounted on a vehicle to the ground surface.

"VA Coil magnetic surface distance": A distance between the plane of the nearest magnetic or conducting component surface to the lower external surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in a case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present invention, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is a name of the network to which you want to connect. It is similar to SSID but can be a more extended concept.

"Basic service set identifier (BSSID)": BSSID including 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is disposed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus including the controller in conjunction with one or more other components, as would be appreciated by a person of ordinary skill in the art.

In an exemplary embodiment of the present invention, a "rapid charging" may refer to a method of directly converting AC power of a power system to DC power, and supplying the converted DC power to a battery mounted on an EV. Here, a voltage of the DC power may be DC 500 volts (V) or less.

In an exemplary embodiment of the present invention, a "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

Hereinafter, embodiments according to an exemplary embodiment of the present invention will be explained in detail by referring to accompanying figures.

FIG. 1 is a conceptual diagram illustrating a concept of a wireless power transfer (WPT) to which an exemplary embodiment of the present invention is applied.

Referring to FIG. 1, a wireless power transfer may be performed by at least one component of an electric vehicle (EV) 10 and a charging station 13, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to an exemplary embodiment of the present invention may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery may be referred to as a plug-in electric vehicle (PEV).

Here, the charging station 13 may be connected to a power grid 15 or a power backbone, and may provide an alternating current (AC) power or a direct current (DC) power to a power transmission pad 14 including a transmission coil through a power link.

Also, the charging station 13 may communicate with an infrastructure management system or an infrastructure server that manages the power grid 15 or a power network through wired/wireless communications, and performs wireless communications with the EV 10.

Here, the wireless communications may be Bluetooth, Zigbee, cellular, wireless local area network (WLAN), or the like.

Also, for example, the charging station 13 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 14 of the charging station 13, and making the reception coil and the transmission coil be interacted or coupled with each other. An electromotive force may be induced in the power reception pad 11 as a result of the interaction or coupling, and the battery 12 may be charged by the induced electromotive force.

The charging station 13 and the transmission pad 14 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad 14 or the power reception pad 11 may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
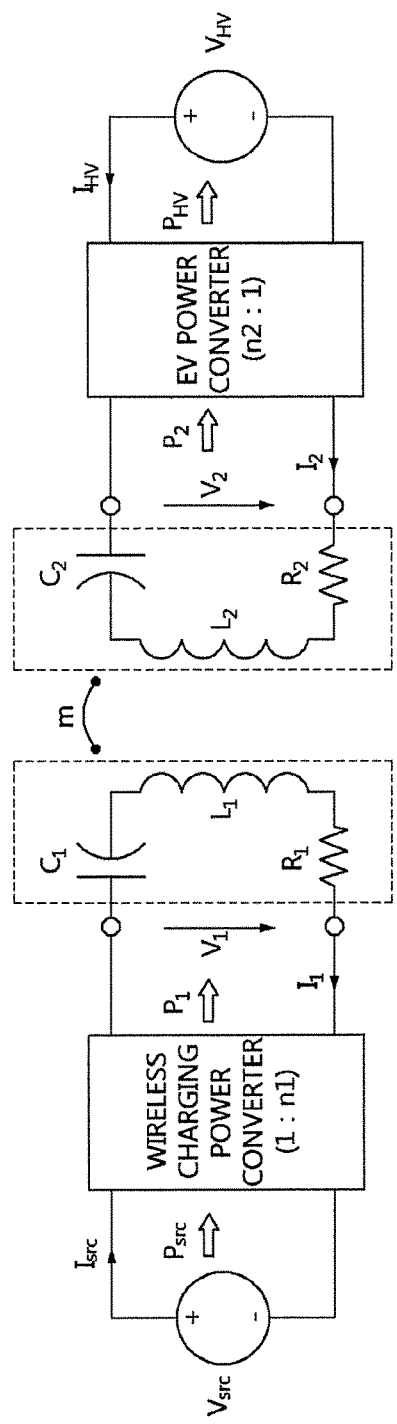
FIG. 2 is a conceptual diagram illustrating a wireless power transfer circuit according to an exemplary embodiment of the present invention.

FIG. 2 is a conceptual diagram illustrating a wireless power transfer circuit according to an exemplary embodiment of the present invention.

Referring to FIG. 2, a schematic configuration of a circuit in which a wireless power transfer is performed in an EV WPT system may be seen.

Here, the left side of FIG. 2 may be interpreted as expressing all or part of a power source Vsrc supplied from the power network, the charging station 13, and the transmission pad 14 in FIG. 1, and the right side of FIG. 2 may be interpreted as expressing all or part of the EV including the reception pad and the battery.

First, the left side circuit of FIG. 2 may provide an output power Psrc corresponding to the power source Vsrc supplied from the power network to a wireless charging power converter. The wireless charging power converter may supply an output power P1 converted from the output power Psrc through frequency-converting and AC-to-DC converting to generate an electromagnetic field at a desired operating frequency in a transmission coil L1.

Specifically, the wireless charging power converter may include an AC/DC converter for converting the power Psrc which is an AC power supplied from the power network into a DC power, and a low frequency (LF) converter for converting the DC power into a DC power having an operating frequency suitable for wireless charging. For example, the operating frequency for wireless charging may be determined to be within 80 to 90 kHz.

The power P1 output from the wireless charging power converter may be supplied again to a circuit including the transmission coil L1, a first capacitor C1 and a first resistor R1. Here, a capacitance of the first capacitor C1 may be determined as a value to have an operating frequency suitable for charging together with the transmission coil L1. Here, the first resistor R1 may represent a power loss occurred by the transmission coil L1 and the first capacitor C1.

Further, the transmission coil L1 may be made to have electromagnetic coupling, which is defined by a coupling coefficient m, with the reception coil L2 so that a power P2 is transmitted, or the power P2 is induced in the reception coil L2. Therefore, the meaning of power transfer in the present invention may be used together with the meaning of power induction.

Still further, the power P2 induced in or transferred to the reception coil L2 may be provided to an EV power converter. Here, a capacitance of a second capacitor C2 may be determined as a value to have an operating frequency suitable for wireless charging together with the reception coil L2, and a second resistor R2 may represent a power loss occurred by the reception coil L2 and the second capacitor C2.

The EV power converter may include an LF/DC converter that converts the supplied power P2 of a specific operating frequency to a DC power having a voltage level suitable for the battery VHV of the EV.

The electric power PHV converted from the power P2 supplied to the EV power converter may be output, and the power PHV may be used for charging the battery VHV disposed in the EV.

Here, the right side circuit of FIG. 2 may further include a switch for selectively connecting or disconnecting the reception coil L2 with the battery VFW. Here, resonance frequencies of the transmission coil L1 and the reception coil L2 may be similar or identical to each other, and the reception coil L2 may be positioned near the electromagnetic field generated by the transmission coil L1.

Here, the circuit of FIG. 2 should be understood as an illustrative circuit for wireless power transfer in the EV WPT system used for embodiments of the present invention, and is not limited to the circuit illustrated in FIG. 2.

On the other hand, since the power loss may increase as the transmission coil L1 and the reception coil L2 are located at a long distance, it may be an important factor to properly set the relative positions of the transmission coil L1 and the reception coil L2.

Here, the transmission coil L1 may be included in the transmission pad 14 in FIG. 1, and the reception coil L2 may be included in the reception pad 11 in FIG. 1. Therefore, positioning between the transmission pad and the reception pad or positioning between the EV and the transmission pad will be described below with reference to the drawings.

Figure 3:
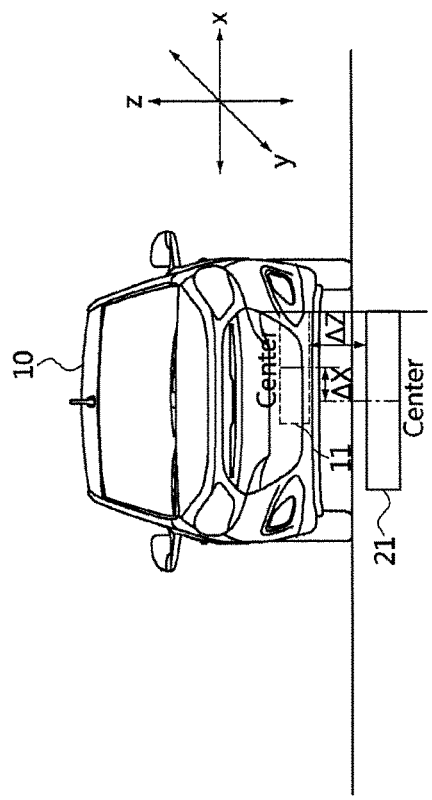
FIG. 3 is a conceptual diagram for explaining a concept of alignment in an EV wireless power transfer according to an exemplary embodiment of the present invention.

FIG. 3 is a conceptual diagram for explaining a concept of alignment in an EV wireless power transfer according to an exemplary embodiment of the present invention.

Referring to FIG. 3, a method of aligning the power transmission pad 14 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 14 is illustrated as positioned below a ground surface as shown in FIG. 3, the transmission pad 14 may also be positioned on the ground surface, or positioned such that a top portion surface of the transmission pad 14 is exposed below the ground surface.

The reception pad 11 of the EV may be defined by different categories according to its heights (defined in the z direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

Here, the height of the reception pad measured from the ground surface may correspond to the previously defined term 'vehicle magnetic ground clearance'.

Further, the position of the power transmission pad 14 in the height direction (i.e., defined in the z direction) may be determined to be located between the maximum class and the minimum class supported by the power reception pad 11. For example, when the reception pad supports only the class 1 and 2, the position of the power transmission pad 14 may be determined between 100 and 210 mm with respect to the power reception pad 11.

Still further, a gap between the center of the power transmission pad 14 and the center of the power reception pad 11 may be determined to be located within the limits of the horizontal and vertical directions (defined in the x and y directions). For example, it may be determined to be located within ±75 mm in the horizontal direction (defined in the x direction), and within ±100 mm in the vertical direction (defined in the y direction).

Here, the relative positions of the power transmission pad 14 and the power reception pad 11 may be varied in accordance with their experimental results, and the numerical values should be understood as exemplary.

Figure 4:
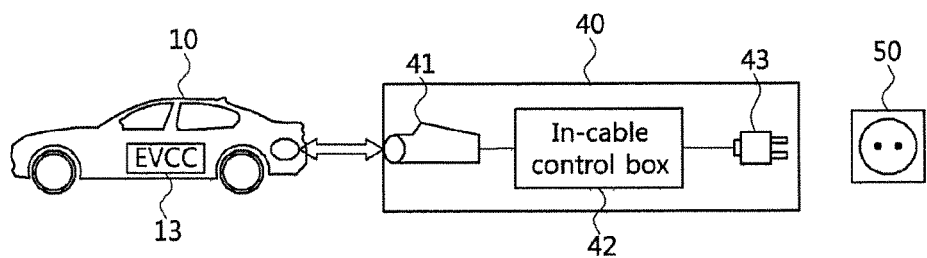
FIG. 4 is a conceptual diagram for explaining an EV conductive charging method according to an embodiment of the present disclosure.

FIG. 4 is a conceptual diagram for explaining an EV conductive charging method according to an embodiment of the present disclosure.

Referring to FIG. 4, an EV conductive charging method may be performed based on interoperations among an EV charging cable 10, at least one component of an EV 20, and a power outlet 50 installed in an existing building or charging stand. Here, the charging stand may be implemented in the same and similar form as the charging station 20 of FIG. 1.

Also, the EV 10 according to the present disclosure may include an inlet for conductively charging the battery. Here, the EV 10 capable of conductively charging the battery may be referred to as a plug-in electric vehicle (PEV) defined above.

Also, the inlet provided in the EV 10 according to the present disclosure may support the slow charging (also referred to as an 'on-board charging') or the rapid charging. Here, the EV 10 may include either a single inlet that supports both of the slow charging and the rapid charging through one plug connection, or inlets that respectively support the slow charging and the rapid charging.

Also, the EV 10 according to the present disclosure may include an EVCC for communicating with other external devices inside or outside, and use the EVCC to control the conductive charging by communicating with an external charging stand or the EV charging cable 40 (i.e., an in-cable control box (ICCB) mounted on the EV charging cable 40).

In addition, the EV 10 according to the present disclosure may include an on-board charger (OBC) to support the slow charging through alternating current (AC) power supplied from a general power system. The OBC may boost the AC power supplied from the general power system to be supplied to the battery in the EV 20 at the time of the slow charging. Accordingly, when the AC power for the slow charging is supplied to the inlet of the EV 10, the slow charging may be performed through the OBC. Also, when a direct current (DC) power for the rapid charging is supplied to the corresponding inlet, the rapid charging may be performed without the OBC.

Here, the EV charging cable 40 may comprise at least one of a charging plug 41 which is connected to the inlet of the EV 10, an outlet plug 43 which is connected to the outlet 50, and the in-cable control box (ICCB) 42.

Here, the charging plug 41 may be a connection part that can be electrically connected to the inlet of the EV 10.

Here, the ICCB 42 may communicate with the EVCC 13 of the EV 10 to receive status information of the EV 10 or to control the electric power charging to the EV 10.

Herein, although the ICCB 42 is illustrated as being included in the EV charging cable 40, it may be mounted in a place other than the EV charging cable 40, or may be combined with a SECC described below or replaced with the SECC.

Here, the outlet plug 43 may be connected to the outlet 50 to which power is supplied as an electrical connection mechanism such as a general plug or a cord set.

For example, the electric power outlet 50 may refer to an outlet installed at various places such as a parking lot attached to a house of an owner of the EV 10, a parking area for charging an EV at a gas station, or a parking area at a shopping center or an office building.

In addition, a device for controlling a charging procedure by communicating with one of the components of the ICCB 42 or the EV 10 (e.g., EVCC) may be installed in a building or place (e.g., a charging stand) where the outlet 50 is installed. Such the device may be referred to as the SECC.

Here, the SECC may communicate with an infrastructure management system for managing a power grid, a management server (a 'community server' which will be described later) of an apartment house in which the outlet 50 is installed, or an infrastructure server through wired or wireless communications.

Here, the outlet 50 may supply AC power of the power system as it is. For example, AC power corresponding to at least one of single-phase two-wire (1P2W) type and three-phase four-wire (3P4W) type may be supplied.

Also, the EV charging cable 40 may support the slow charging, and supply electric power for the slow charging to the EV 10. Here, electric power of 3.3 to 7.7 kWh may be supplied to the EV 10 for the slow charging.

Also, the EV charging cable 40 may support the rapid charging, and supply electric power for the rapid charging to the EV 10. Here, electric power of 50 to 100 kWh may be supplied to the EV 20 for the rapid charging.

Figure 5:
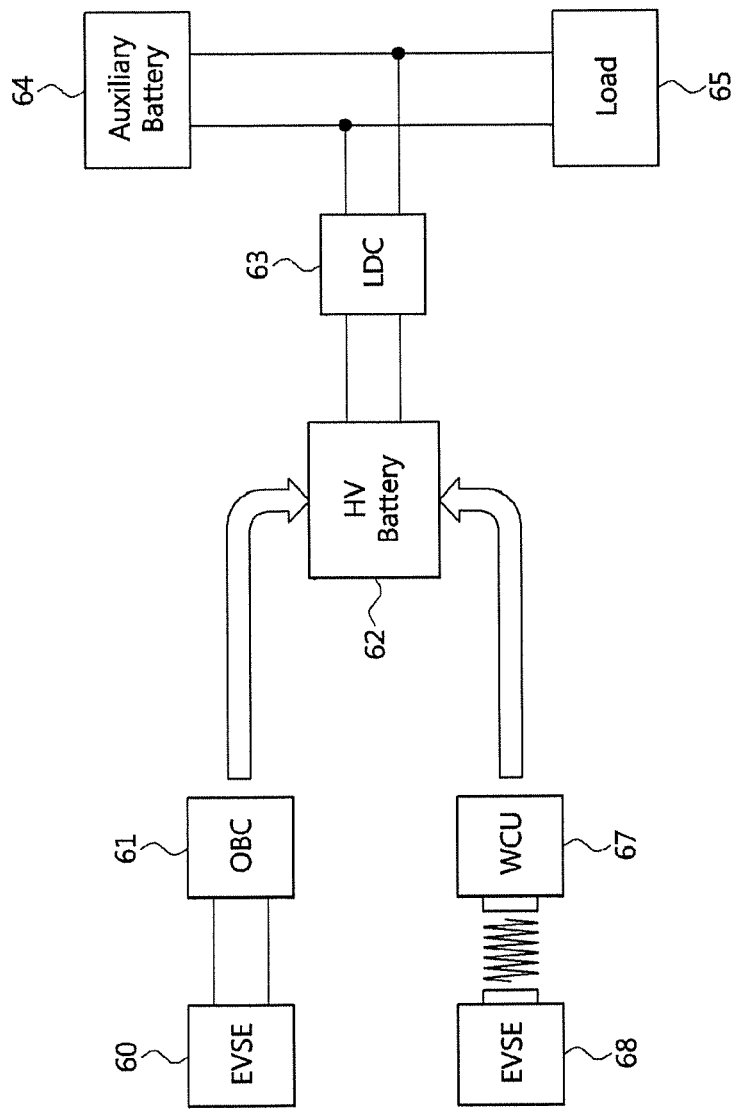
FIG. 5 is a conceptual diagram for explaining usual conductive charging process or inductive charging process for electric vehicles.

FIG. 5 is a conceptual diagram for explaining usual conductive charging process or inductive charging process for electric vehicles.

Referring to FIG. 5, electric power is supplied from an EVSE 60 or 68 to a high-voltage battery 62 built in an EV in an inductive or conductive manner, and the high-voltage battery supplies electric power to a load 65 or an auxiliary battery 64. Here, the process of supplying electric power in the inductive or conductive manner may be construed as being able to be performed by referring to the processes described in FIGS. 1, 2 and 4.

Here, the EVSE 60 or 68 may correspond to the charging station 20 in FIG. 1 or all or a part of the apparatus provided with the outlet 50 in FIG. 4, and may refer to a device for supplying electric power to an EV. The EVSEs 60 and 68 are separately illustrated for explaining the conductive charging using an OBC 61 and the inductive charging using a wireless control unit (WCU) 67 in a single figure, but they may be implemented as a single device.

Here, the OBC 61 may refer to the on-board charger described above with reference to FIG. 4. Although the OBC 61 is illustrated as a premise for the slow charging described above, the conductive charging (e.g., the rapid charging described above) may be performed without the OBC 61. When the charging is performed without the OBC 61, the OBC 61 may be replaced with a device receiving electric power in a conductive manner from the inside and the outside of the EV.

Here, the high-voltage battery 62 is a high-voltage battery built in the EV, and may provide electric power to the EV.

Here, the WCU 67 may refer to a wireless control unit for controlling the inductive charging process for the EV according to FIGS. 1 and 2, and may be mounted inside or outside the EV.

Here, a low-voltage DC-to-DC converter (LDC) 63 may be a device for converting DC power supplied from the high-voltage battery into low-voltage DC power used for an auxiliary battery 64 or a load 65. For example, the LDC 63 may convert the DC power supplied from the high-voltage battery 64 to 12 V DC power.

Here, the auxiliary battery 64 is mounted inside the EV and may supply electric power to a control system of the EV.

Here, the load 65 may represent loads caused by various electronic devices used in the EV as a single element, and may be assumed to be a single device receiving 12V DC power.

The conductive charging process may be described with reference to FIG. 5. The EVSE 60 may supply electric power for the conductive charging to the OBC 61 mounted on the EV. Then, the OBC 61 may convert the supplied electric power (i.e., low-voltage AC power) into a voltage-boosted DC power sufficient to charge the high-voltage battery 62, and supply the converted electric power to the high-voltage battery 62. In the conductive charging process, the high-voltage battery 62 may supply electric power to the auxiliary battery 64 and the load 65 via the LDC 63.

The inductive charging process may also be described with reference to FIG. 5. The EVSE 68 may wirelessly supply electric power for the inductive charging to the WCU 67 mounted on the EV. Then, the WCU 67 may supply the supplied electric power (low-voltage AC power) to the high-voltage battery 62. Similarly to the conductive charging process, the high-voltage battery 62 may supply electric power to the auxiliary battery 64 and the load 65 through the LDC 63.

Here, the charging of the high-voltage battery may be delayed because the conductive charging process or the inductive charging process may be performed simultaneously with charging the auxiliary battery or load by using the output of the high-voltage battery while the high-voltage battery is being charged. For example, assuming an external electric power of 2.2 kW (220V/10 A) is supplied to the EV and used to charge the high-voltage battery of the EV, approximately 360V/1~2 A or more power, from about 360V/6 A power which should be used to charge the high-voltage battery, may be consumed for charging the auxiliary battery and driving the load. This corresponds to ⅓ to ¼ of the actual charging power, which has a considerable influence on a charging time for the high-voltage battery.

Therefore, in an environment where both the conductive charging and the inductive charging are available, it is necessary to quickly charge the high-voltage battery by simultaneously using both of the conductive charging and the inductive charging.

Hereinafter, a more improved charging process according to the present disclosure will be described.

Figure 6:
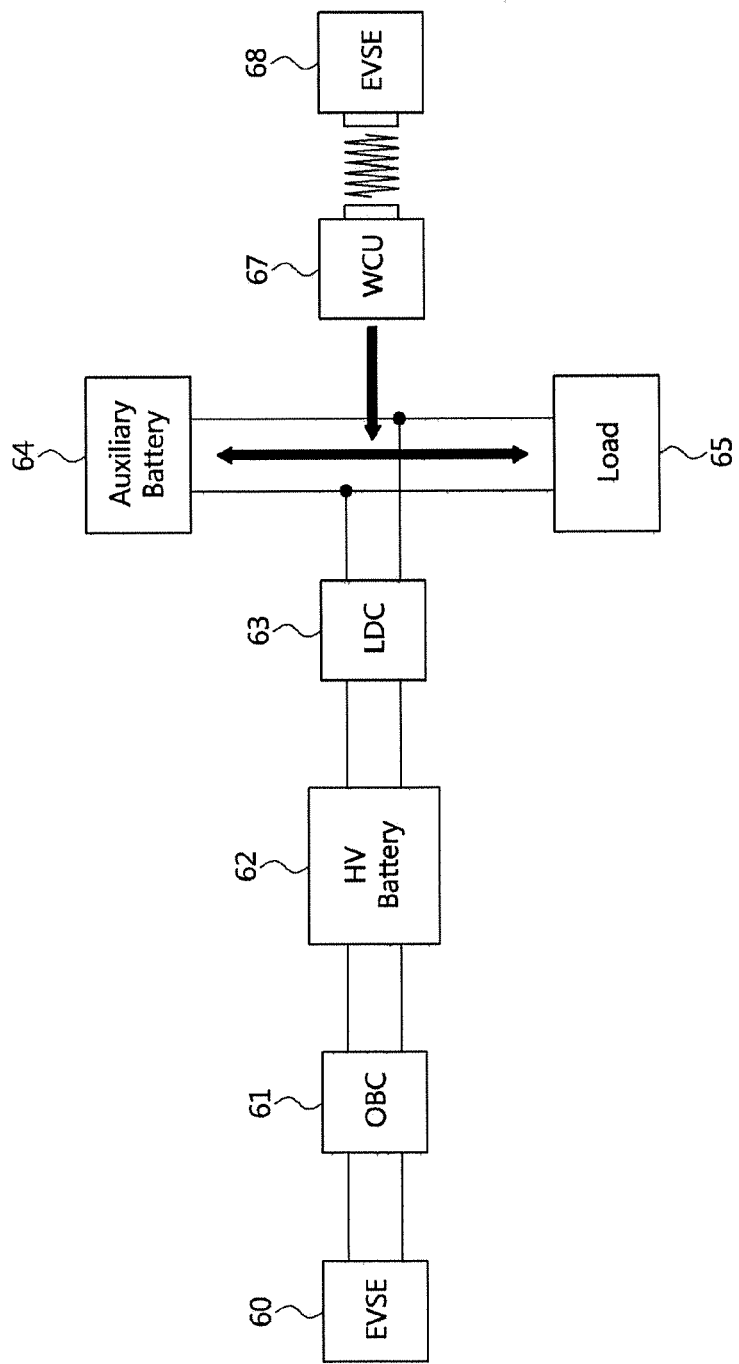
FIG. 6 is a conceptual diagram for explaining an EV parallel charging process according to an embodiment of the present disclosure.

FIG. 6 is a conceptual diagram for explaining an EV parallel charging process according to an embodiment of the present disclosure.

Referring to FIG. 6, the EV parallel charging process may be understood as a process of charging the high-voltage battery in the conductive charging manner and supplying electric power to the auxiliary battery and load in the inductive charging manner. Here, each component can refer to the description in FIG. 5.

Specifically, when the EVSE 60 transfers electric power to the OBC 61 in the conductive manner, the OBC 61 may boost and convert the transferred electric power to a voltage-boosted DC power, and supply it to the high-voltage battery 62. Unlike the case of FIG. 5, once the charging of the high-voltage battery 62 is started, the LDC may be inactivated to prevent the power of the high-voltage battery 62 from being supplied to the auxiliary battery 64 or load 65.

At this time, the EVSE 68 may wirelessly supply electric power to the WCU 67 and the WCU 67 may supply electric power to the auxiliary battery 64 or load 65 instead of the high-voltage battery 62.

Although it is explained that the high-voltage battery 62 is charged in the conductive manner and the auxiliary battery 64 and load 65 are powered in the inductive manner, the present disclosure is not limited thereto. Alternatively, the high-voltage battery 62 may be charged in the inductive manner and the auxiliary battery 64 and load 65 may be powered in the conductive manner.

In the present embodiment, since the OBC 61 is required to supply electric power to the high-voltage battery 62 as well as the auxiliary battery 64, the OBC 61 may include at least one DC-to-DC converter which converts the AC power received from the EVSE to an electric power having a voltage level suitable for the high-voltage battery 62 and an electric power having a voltage level suitable for the auxiliary batter 64, and supplies the converted DC powers to them. Here, the DC/DC converter may control the voltage level of the DC output by controlling a frequency and a duty ratio of each switching element therein.

In the present embodiment, since the WCU 67 is required to supply electric power to the high-voltage battery 62 and the auxiliary battery 64 in the same manner as the OBC 61, the WCU 67 may also include at least one DC-to-DC converter which converts the AC power received from the EVSE to an electric power having a voltage level suitable for the high-voltage battery 62 and an electric power having a voltage level suitable for the auxiliary batter 64, and supplies the converted DC powers to them.

Also, in a case that only one of the inductive charging and the conductive charging is performed (hereinafter referred to as a 'single charging operation'), the charged amount (e.g., state of charge (SOC)) of the auxiliary battery may be monitored in real time, and the LDC 63 may be activated selectively only when the SOC is equal to or less than a threshold value. Accordingly, the amount of electric power delivered to the high-voltage battery 62 can be maximized.

Figure 7:
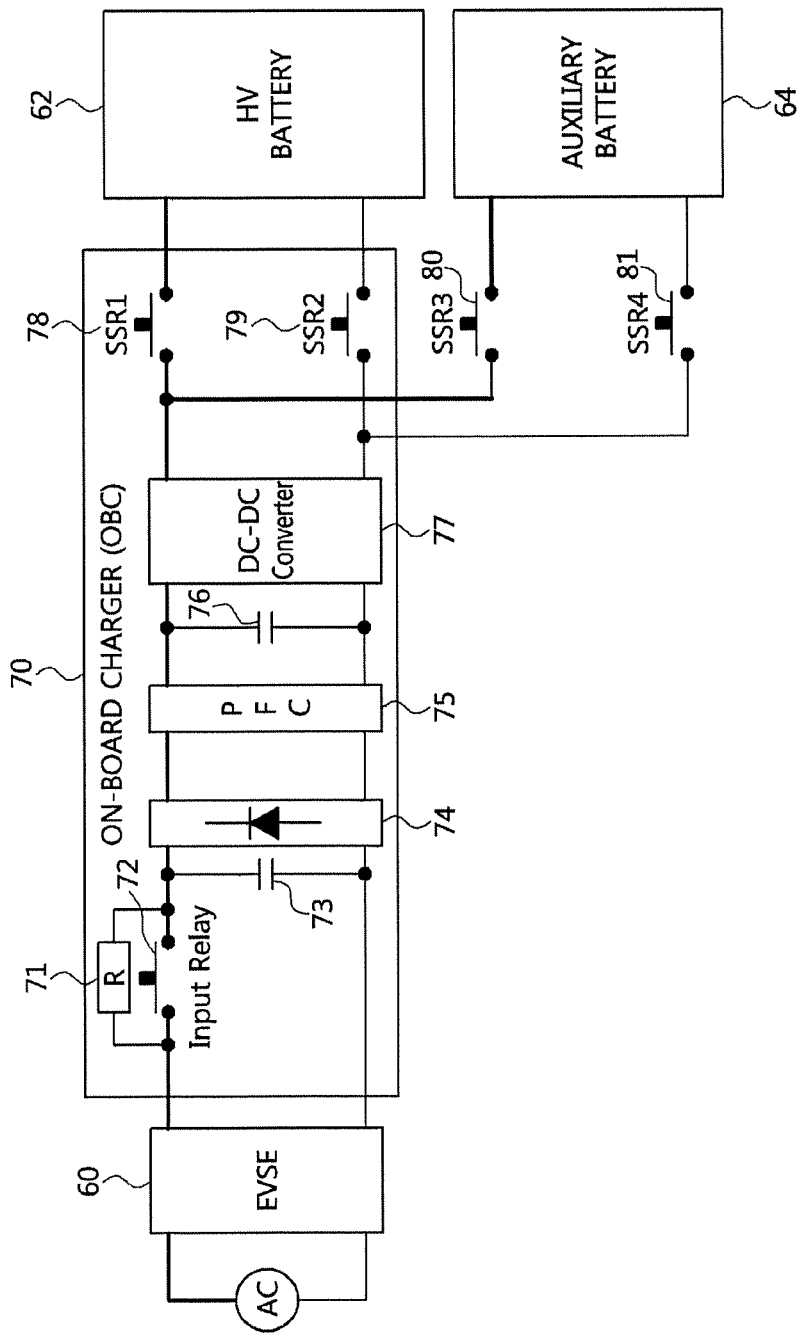
FIG. 7 is a block diagram illustrating a circuit for performing an EV parallel charging process according to an embodiment of the present disclosure.

FIG. 7 is a block diagram illustrating a circuit for performing an EV parallel charging process according to an embodiment of the present disclosure.

Referring to FIG. 7, a circuit capable of implementing the parallel charging processing of an EV according to FIG. 6 may be exemplarily described.

In FIG. 7, the on-board charger (OBC) 70 may comprise an input relay 72 having a resistor 71 having a predetermined resistance R which is connected in parallel, an input capacitor 73 having a capacitance of several microfarads, an input stage rectifier circuit 74, a power factor correction circuit (PFC) 75, a smoothing capacitor 76, a DC-to-DC converter 77, a first solid-state relay (SSR) 78, a second SSR 79, a third SSR 80, and a fourth SSR 81.

Here, input ends of the OBC 70 may be connected to the EVSE 60, the OBC 70 may conductively receive electric power supplied from the EVSE 60. Also, output ends of the OBC 70 may be connected to a high-voltage battery 62 via the first SSR 78 and the second SSR 79, and may be connected to an auxiliary battery 64 via the third SSR 80 and the fourth SSR 81.

Also, one end of the input relay 72 may be connected in series to one of the input ends of the OBC 70. Also, the input capacitor 73, the input stage rectifier circuit 74, the PFC 75, the smoothing capacitor 76, and the DC/DC converter 77 may be connected in parallel to the other end of the input relay 72 and the other of the input ends of the OBC 70. The first SSR 78 and the SSR 79 may be connected in series at respective output ends of the DC-to-DC converter 77.

Here, although the DC-to-DC converter 77 and the SSRs are illustrated as additionally connected to the output ends of the OBC 70 in FIG. 5, but embodiments of the present disclosure are not limited thereto.

Also, when the OBC 70 is responsible for charging the high-voltage battery 62, the output of the DC-to-DC converter 77 may be adjusted to match the voltage level of the high-voltage battery 62, and the first SSR 78 and the second SSR 79 may be turned on. At this time, the third SSR 80 and the fourth SSR 81 may be turned off to insulate the auxiliary battery 64 from the OBC 70.

Also, when the OBC 70 is responsible for charging the auxiliary battery 64, the output of the DC-to-DC converter 77 may be adjusted to match the voltage level of the auxiliary battery 64, and the third SSR 80 and the fourth SSR 81 may be turned on. At this time, the first SSR 78 and the second SSR 79 may be turned off to insulate the high-voltage battery 62 from the OBC 70.

Although not illustrated in FIG. 7, the WCU in FIG. 6 may serve to supply electric power to the auxiliary battery 64 or the load, and the output of the WCU may be insulated from the high-voltage battery 62 by turning off corresponding SSRs.

Figure 8:
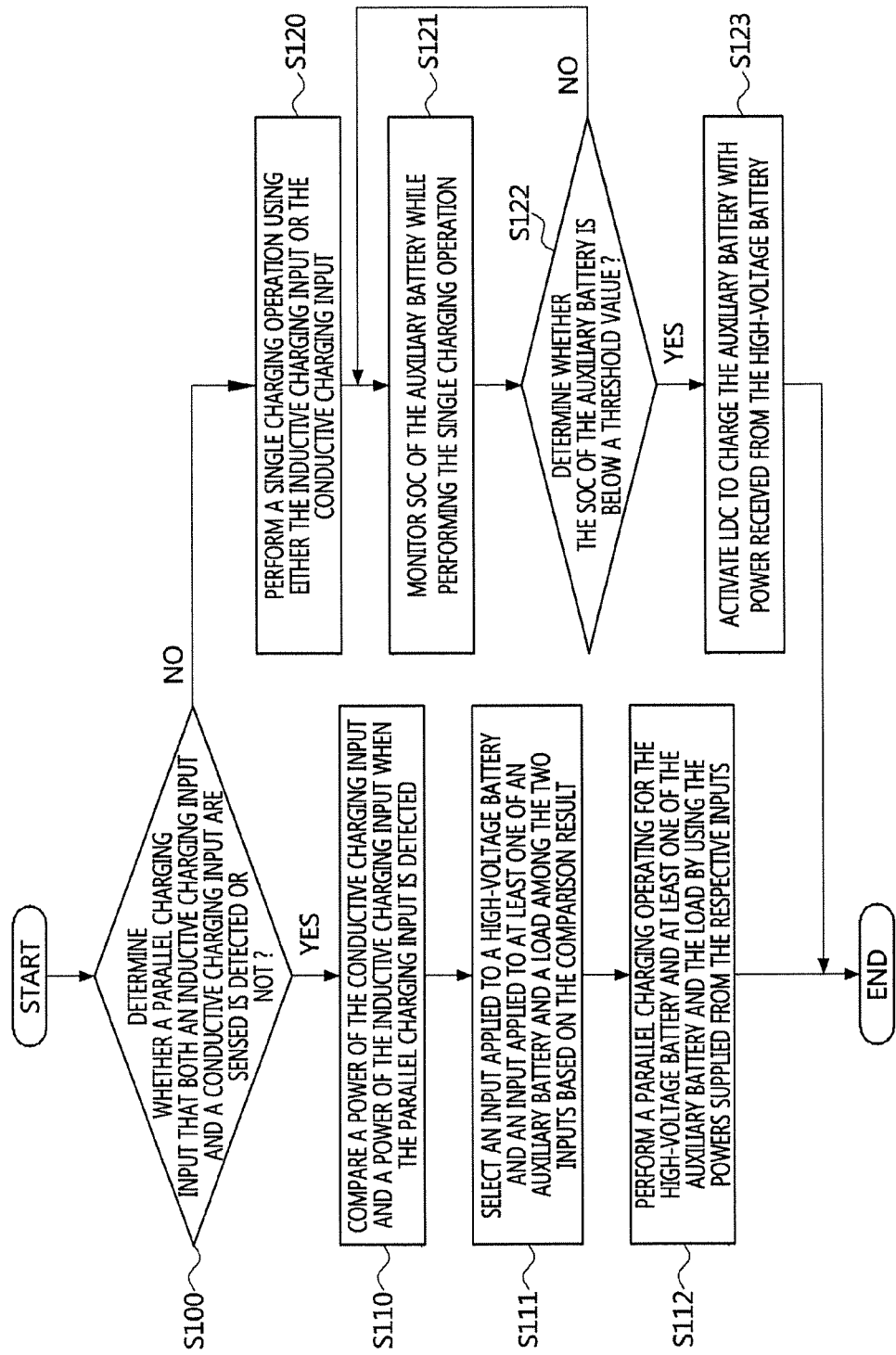
FIG. 8 is a flow chart for explaining an EV parallel charging method according to an embodiment of the present disclosure.

FIG. 8 is a flow chart for explaining an EV parallel charging method according to an embodiment of the present disclosure.

Referring to FIG. 8, the EV parallel charging method may comprise a step S100 of determining whether a parallel charging input that both an inductive charging input and a conductive charging input are sensed is detected or not; a step S110 of comparing a power of the conductive charging input and a power of the inductive charging input when the parallel charging input is detected; a step S111 of selecting an input applied to a high-voltage battery and an input applied to at least one of an auxiliary battery and a load among the two inputs based on the comparison result; and a step S112 of performing a parallel charging operation for the high-voltage battery and at least one of the auxiliary battery and the load by using the powers supplied from the respective inputs.

Here, the EV parallel charging method may further comprise, after the step S100 of determining whether or not the parallel charging input is detected, inactivating the LDC connected between the high-voltage battery and the auxiliary battery.

That is, when the parallel charging input is detected, since powers are to be respectively provided to the high-voltage battery and the auxiliary battery and load, the power consumption of the LDC may be prevented by inactivating the LDC.

Also, even when the parallel charging input is not detected (i.e., even when only one of the inductive charging and the conductive charging is performed), the LDC may be inactivated, and then re-activated only when an energy stored in the auxiliary battery becomes insufficient. Accordingly, electric power may be prevented from being supplied from the high-voltage battery to the auxiliary battery by inactivating the LDC, and thus the high-voltage battery can be charged more quickly.

Specifically, for example, in response to whether the parallel charging input is detected or not, a single charging operation using either the inductive charging input or the conductive charging input may be performed (S120). The state of charge (SOC) of the auxiliary battery may be monitored while performing the single charging operation (S121).

Also, as a result of the monitoring, it is possible to determine whether the SOC of the auxiliary battery is below a threshold value (S122). If the charged amount of the auxiliary battery is less than the threshold value, the LDC may be activated to charge the auxiliary battery with the power received from the high-voltage battery (S123).

Here, the step S100 may include a step of sensing the inductive charging input according to whether a wireless communication pairing between the SECC and the EVCC has been established or not. That is, in the case that the wireless communication pairing between the SECC and the EVCC has been established, the inductive charging input may be determined as sensed.

Here, the step S100 may include a step of sensing the conductive charging input according to whether a control pilot or a conductive input of a power driver (PD) is recognized. That is, in the case that the control pilot or the conductive input of the PD is recognized, the conductive charging input may be determined as sensed.

Here, the control pilot may be various charging control signals provided to the EV. For example, the control pilot may be a signal that limits or reduces the maximum charging power.

Therefore, when both the inductive charging input and the conductive charging input are sensed, it may be determined that the parallel charging input is detected.

Here, the step S110 may include a step of determining the power P1 of the conductive charging input based on a system voltage and a current of the control pilot which are provided in the conductive manner.

For example, the power P1 of the conductive charge input may be determined according to Equation 1.

$$P_1 = V_{system} \times I_{CP}$$ [Equation 1]

Here, $V_{system}$ may mean the system voltage provided through EVSE in the conductive manner, and $I_{CP}$ may mean the current of the control pilot.

Here, the step S100 may include a step of determining the upper limit of the output power of the SECC as the power P2 of the inductive charging input.

Here, in the step S111, an input having the higher power among the inductive charging input and the conductive charging input may be selected as the input to be applied to the high-voltage battery, and an input having the lower power among the inductive charging input and the conductive charging input may be selected as the input to be applied to at least one of the auxiliary battery and the load.

Here, the step S112 may include a step of turning off a relay switch between the input applied to the high-voltage battery and the at least one of the auxiliary battery and the load.

Here, the step S112 may include a step of turning off a relay switch between the input applied to the at least one of the auxiliary battery and the load and the high-voltage battery.

Figure 9:
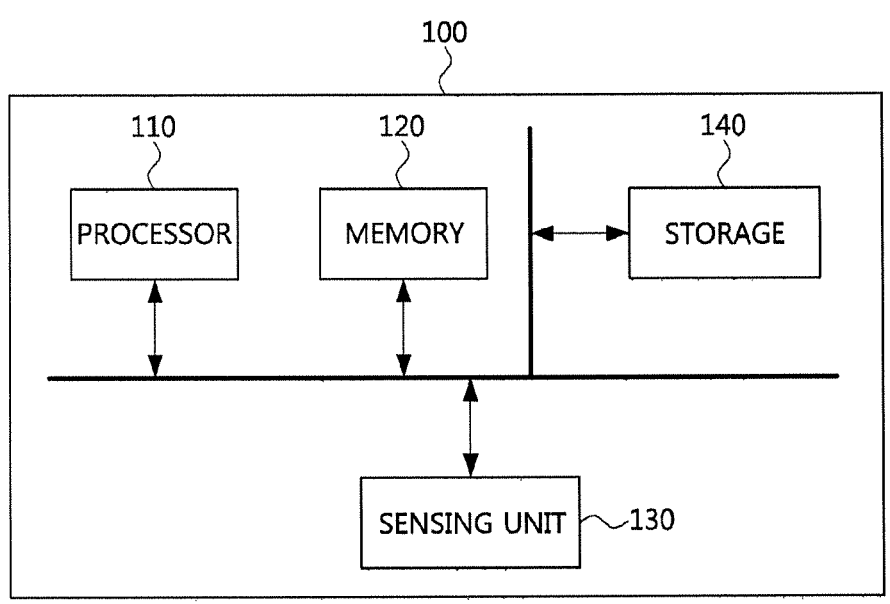
FIG. 9 is a block diagram illustrating an EV parallel charging apparatus according to an embodiment of the present disclosure.

FIG. 9 is a block diagram illustrating an EV parallel charging apparatus according to an embodiment of the present disclosure.

Referring to FIG. 9, an EV parallel charging apparatus 100 may comprise at least one processor 110 and a memory 120 for storing instructions executed by the at least one processor 110. Also, the instructions stored in the memory 120 may be configured to make the at least one processor 110 perform one or more steps.

Also, the EV parallel charging apparatus 100 may further comprise a sensing unit for sensing the conductive charging input or the inductive charging input.

Also, the EV parallel charging apparatus 100 may further comprise a storage 140 for storing data required during the parallel charging or the single charging operation. For example, the storage 140 may be a hard disk drive (HDD), a solid state drive (SSD), or the like.

Here, the one or more steps may include a step of determining whether the parallel charging input that both the inductive charging input and the conductive charging input are sensed is detected or not; a step of comparing a power of the conductive charging input and a power of the inductive charging input when the parallel charging input is detected; a step of selecting an input applied to the high-voltage battery and an input applied to the auxiliary battery and the load among the two inputs based on the comparison result; and a step of performing a parallel charging operation for the high voltage battery and at least one of the auxiliary battery and the load by using the powers supplied from the respective inputs.

Here, the instructions may be configured to further perform a step of inactivating the LDC connected between the high-voltage battery and the auxiliary battery after the step of determining whether or not the parallel charging input is detected.

Also, the instructions may be further configured to perform a step of performing a single charging operation using either the inductive charging input or the conductive charging input in response to determining that the parallel charging input is not detected; a step of monitoring the state of charge (SOC) of the auxiliary battery while performing the single charging operation; a step of determining whether the SOC of the auxiliary battery is below a threshold value based on a result of the monitoring; and a step of activating the LDC to charge the auxiliary battery with the power received from the high-voltage if the charged amount of the auxiliary battery is less than the threshold value.

Here, the step of determining whether the parallel charging input is detected may include a step of sensing the inductive charging input according to whether a wireless communication pairing between the SECC and the EVCC has been established or not.

Here, the step of determining whether the parallel charging input is detected may include a step of sensing the conductive charging input according to whether a control pilot or a conductive input of a power driver (PD) is recognized.

Here, the step of comparing the power of the conductive charging input and the power of the inductive charging input may include a step of determining the power P1 of the conductive charging input based on a system voltage and a current of the control pilot which are provided in the conductive manner.

For example, the power P1 of the conductive charge input may be determined according to Equation 1 described above.

Here, the step of comparing the power of the conductive charging input and the power of the inductive charging input may include a step of determining the upper limit of the output power of the SECC as the power P2 of the inductive charging input.

Here, in the step of selecting the input applied to the high-voltage battery and the input applied to at least one of the auxiliary battery and the load, an input having the higher power among the inductive charging input and the conductive charging input may be selected as the input applied to the high-voltage battery, and an input having the lower power among the inductive charging input and the conductive charging input may be selected as the input applied to at least one of the auxiliary battery and the load.

Here, the step of performing a parallel charging operation for the high voltage battery and the auxiliary battery may include a step of turning off a relay switch between the input to be applied to the high-voltage battery and the at least one of the auxiliary battery and the load.

Here, the step of performing a parallel charging operation for the high voltage battery and the auxiliary battery may include a step of turning off a relay switch between the input to be applied to the at least one of the auxiliary battery and the load and the high-voltage battery.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present invention or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present invention, and vice versa.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. An electric vehicle (EV) parallel charging method performed in an EV parallel charging apparatus, comprising:
   determining whether a parallel charging input is detected or not, the parallel charging input being an input that both a conductive charging input and an inductive charging input are sensed;
   in response to determining that the parallel charging input is detected, comparing a power of the conductive charging input with a power of the inductive charging input;
   selecting an input applied to a high-voltage battery and an input applied to at least one of an auxiliary battery and a load based on a result of the comparison; and
   performing a parallel charging operation for the high-voltage battery and at least one of the auxiliary battery and the load by using powers supplied from the selected inputs.

2. The EV parallel charging method of claim 1, further comprising, after the determining whether a parallel charging input is detected or not, inactivating a low-voltage direct current to direct current converter (LDC) connected between the high-voltage battery and the auxiliary battery.

3. The EV parallel charging method of claim 2, further comprising:
   in response to determining that the parallel charging input is not detected, performing a single charging operation using either the conductive charging input or the inductive charging input;

monitoring a state of charge (SOC) of the auxiliary battery while performing the single charging operation;

determining whether the SOC of the auxiliary battery is equal to or below a threshold; and in response to determining that the SOC of the auxiliary battery is equal to or below the threshold, performing a charging for the auxiliary battery using a power transferred from the high-voltage battery by activating the LDC.

4. The EV parallel charging method of claim 1, wherein, in the determining whether a parallel charging input is detected or not, the inductive charging input is sensed according to whether a wireless communication pairing between an electric vehicle communication controller (EVCC) and a supply equipment communication controller (SECC) has been established or not.

5. The EV parallel charging method of claim 1, wherein, in the determining whether a parallel charging input is detected or not, the conductive charging input is sensed according to whether a conductive input of a control pilot or a power driver (PD) is recognized or not.

6. The EV parallel charging method of claim 1, wherein, in the comparing a power of the conductive charging input with a power of the inductive charging input, the power P1 of the conductive charging input is determined based on a current of a control pilot and a system voltage which are supplied in a conductive manner.

7. The EV parallel charging method of claim 1, wherein, in the comparing a power of the conductive charging input with a power of the inductive charging input, an upper limit of an output power of a supply equipment communication controller (SECC) is determined as the power P2 of the inductive charging input.

8. The EV parallel charging method of claim 1, wherein, in the selecting an input applied to a high-voltage battery and an input applied to at least one of an auxiliary battery and a load, an input having a higher power among the conductive charging input and the inductive charging input is selected as the input applied to the high-voltage battery, and an input having a lower power among the conductive charging input and the inductive charging input is selected as the input applied to the at least one of the auxiliary battery and the load.

9. The EV parallel charging method of claim 8, wherein the performing a parallel charging operation includes turning off a relay switch connected between the input applied to the high-voltage battery and the at least one of the auxiliary battery and the load.

10. The EV parallel charging method of claim 8, wherein the performing a parallel charging operation includes turning off a relay switch connected between the high-voltage battery and the input applied to the at least one of the auxiliary battery and the load.

11. An electric vehicle (EV) parallel charging apparatus comprising at least one processor and a memory storing instructions executed by the at least one processor, wherein the instructions are configured to:

determine whether a parallel charging input is detected or not, the parallel charging input being an input that both a conductive charging input and an inductive charging input are sensed;

in response to determining that the parallel charging input is detected, compare a power of the conductive charging input with a power of the inductive charging input;

select an input applied to a high-voltage battery and an input applied to at least one of an auxiliary battery and a load based on a result of the comparison; and perform a parallel charging operation for the high-voltage battery and at least one of the auxiliary battery and the load by using powers supplied from the selected inputs.

12. The EV parallel charging apparatus of claim 11, wherein the instructions are further configured to inactivate a low-voltage direct current to direct current converter (LDC) connected between the high-voltage battery and the auxiliary battery after whether a parallel charging input is detected or not is determined.

13. The EV parallel charging apparatus of claim 12, wherein the instructions are further configured to:

in response to determining that the parallel charging input is not detected, perform a single charging operation using either the conductive charging input or the inductive charging input;

monitor a state of charge (SOC) of the auxiliary battery while performing the single charging operation;

determine whether the SOC of the auxiliary battery is equal to or below a threshold; and in response to determining that the SOC of the auxiliary battery is equal to or below the threshold, perform a charging for the auxiliary battery using a power transferred from the high-voltage battery by activating the LDC.

14. The EV parallel charging apparatus of claim 11, wherein the instructions are further configured to sense the inductive charging input according to whether a wireless communication pairing between an electric vehicle communication controller (EVCC) and a supply equipment communication controller (SECC) has been established or not.

15. The EV parallel charging apparatus of claim 11, wherein the instructions are further configured to sense the conductive charging input according to whether a conductive input of a control pilot or a power driver (PD) is recognized or not.

16. The EV parallel charging apparatus of claim 11, wherein the instructions are further configured to determine the power P1 of the conductive charging input based on a current of a control pilot and a system voltage which are supplied in a conductive manner.

17. The EV parallel charging apparatus of claim 11, wherein the instructions are further configured to determine an upper limit of an output power of a supply equipment communication controller (SECC) as the power P2 of the inductive charging input.

18. The EV parallel charging apparatus of claim 11, wherein an input having a higher power among the conductive charging input and the inductive charging input is selected as the input applied to the high-voltage battery, and an input having a lower power among the conductive charging input and the inductive charging input is selected as the input applied to the at least one of the auxiliary battery and the load.

19. The EV parallel charging apparatus of claim 11, wherein, when the parallel charging operation is performed, a relay switch, which is connected between the input applied to the high-voltage battery and the at least one of the auxiliary battery and the load, is turned off.

20. The EV parallel charging apparatus of claim 11, wherein, when the parallel charging operation is performed, a relay switch, which is connected between the high-voltage battery and the input applied to the at least one of the auxiliary battery and the load, is turned off.

* * * * *